United States Patent
Kraus

[11] 3,776,051
[45] Dec. 4, 1973

[54] ROTARY MOTION TRANSMITTING DEVICE

[75] Inventor: Charles E. Kraus, Austin, Tex.

[73] Assignee: Excelermatic Inc.

[22] Filed: July 7, 1972

[21] Appl. No.: 269,531

[52] U.S. Cl. .................................. 74/208, 74/206
[51] Int. Cl. ............................................ F16h 13/14
[58] Field of Search .................... 74/208, 206, 202, 74/211

[56] References Cited
UNITED STATES PATENTS
3,380,312  4/1968  Barske .................................. 74/206

Primary Examiner—Manuel A. Antonakas
Assistant Examiner—Allan Russell Burke
Attorney—T. L. Bowes

[57] ABSTRACT

A rotary motion transmitting device including traction rollers for the transmission of motion from an input to an output shaft. One of the shafts carries a traction ring and the other shaft whose axis is parallel to, but spaced from, the axis of the one shaft has an end portion extending into the traction ring, so that between the traction ring and the end portion of said one shaft an annular space is formed in which traction rollers are disposed which are forced into firm engagement with the traction ring and the end portion of the other shaft by the torque transmitted through the device.

13 Claims, 5 Drawing Figures

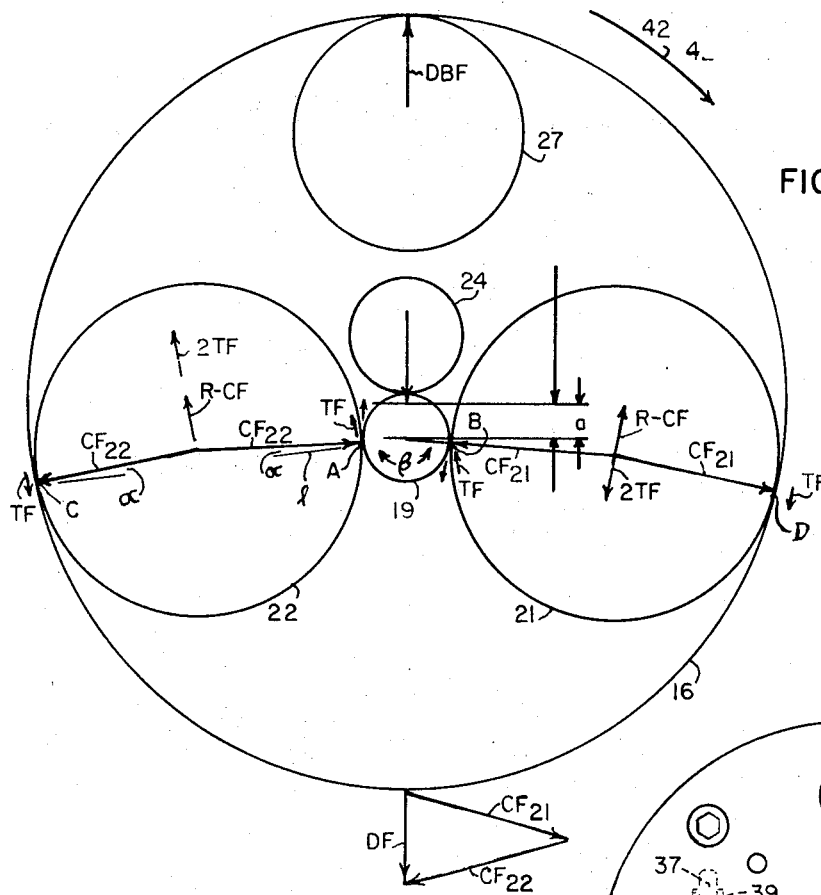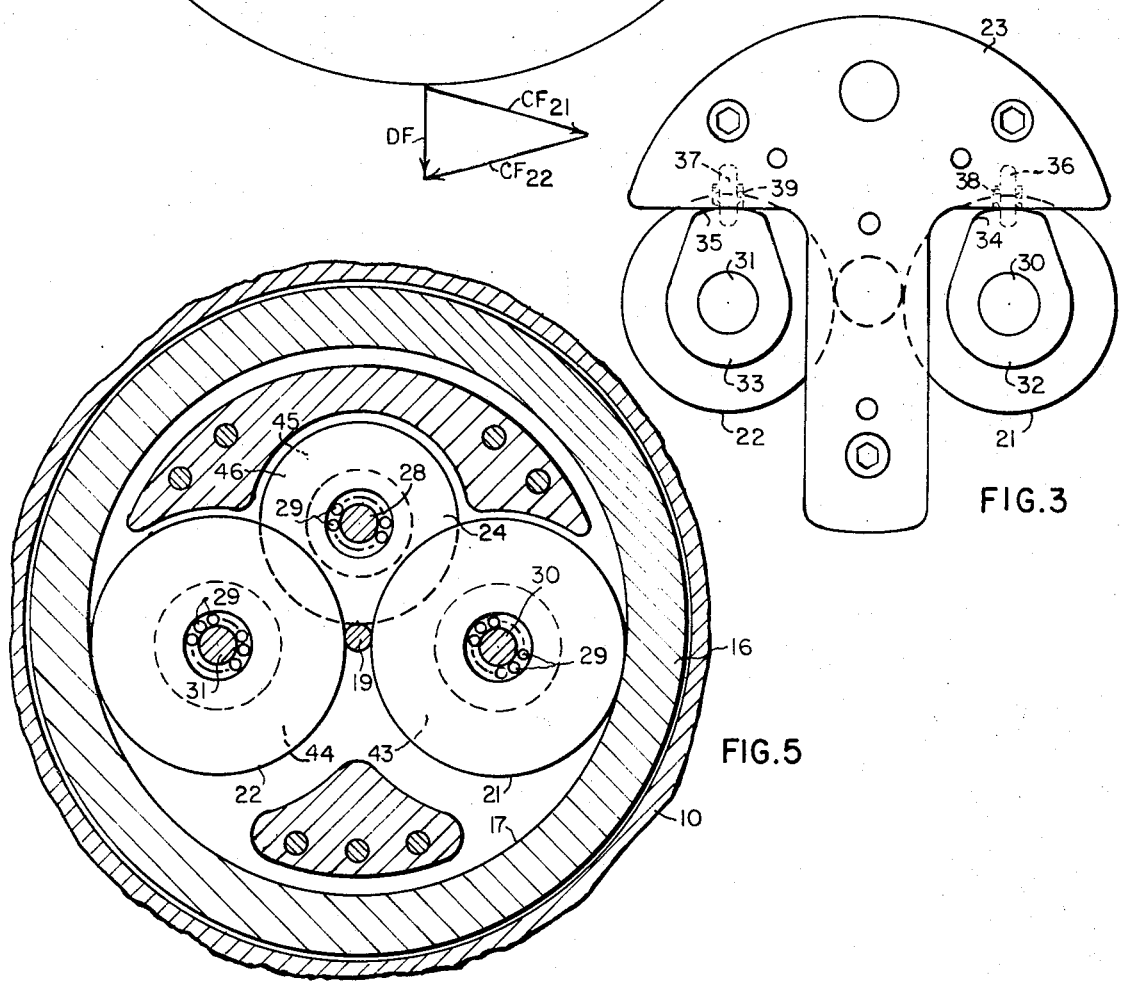

ROTARY MOTION TRANSMITTING DEVICE

BACKGROUND OF THE INVENTION

The invention relates to a rotary motion transmitting device with fixed transmission ratio in which power is transmitted by frictional engagement of the motion transmitting surfaces.

In fixed ratio friction wheel transmissions, the forces required to engage the torque transmitting wheels with each other depend on the amount of the torque to be transmitted and on the properties of the surfaces in engagement with each other. Friction wheels with surfaces having a high friction coefficient, such as rubber wheels, require only small contact forces. On the other hand, friction wheels with hardened metallic, lubricated surfaces require extremely large contact forces.

If the contact forces in such transmissions are provided for a predetermined maximum load, slippage will occur at higher loads and unnecessarily large contact forces are effective at lower than maximum loads. Therefore, in some transmissions, the friction wheels are arranged to be forced into engagement with each other by the torque or load transmitted by the transmission so that large contact forces are effective only while large torques are transmitted. The power transmitted by such transmissions is, however, very limited and relatively large bearing forces are required to insure frictional engagement between the friction wheels.

Various fixed ratio friction wheel transmissions are described in Harold A. Rothbart, Mechanical Design and Systems Handbook, pages 14–8 and 14–9, McGraw Hill, New York 1964.

SUMMARY OF THE INVENTION

A rotary motion transmitting device consisting of a planetary roller arrangement wherein a shaft end portion (sun roller) is disposed within a traction ring slightly offset from the center of the traction ring, and at least two planetary rollers are disposed in the annular space between the sun roller and the traction ring such that all planetary rollers are held in firm engagement with the sun roller and the traction ring with a force proportional to the torque transmitted by the motion transmitting device. To make this possible, at least one of the planetary rollers is free to be drawn by the torque forces into the narrowing annular space between the sun roller and the traction ring whereas the other planetary roller or rollers are restrained in their positions in the annular space, the sun roller being free to be forced by the one planetary roller into firm engagement with the other rollers.

BRIEF DESCRIPTION OF THE DRAWINGS

FIG. 3 shows the support arrangement for the traction rollers in the housing of the transmission;

FIG. 4 is a schematic representation of the transmission showing the forces effective during operation; and FIG. 5 shows an embodiment of the invention particularly suitable for large transmission ratios.

As shown in FIGS. 1 and 2, the transmission has a housing 10 consisting of a base 11 and a cover 12 firmly mounted on the base 11 as by bolts. The housing cover 12 has an opening 13 through which shaft 14 extends supported by bearing 15 mounted on the cover 12 and sealed by a seal ring 13a disposed in the opening 13. Inside the housing 10, the shaft 14 carries a traction ring 16 having an inner traction surface 17. The base 11 has an opening 18 through which shaft 19 having a traction surface 20 extends into the traction ring 16. The axes of the shafts 14 and 19 are parallel but displaced from each other by a distance a (FIG. 2) so that between the traction surfaces 17 and 20 of the traction ring 16 and the shaft 19 an annular path of varying width is formed, the path being the widest and the narrowest in the axial plane P through the axes of the shafts 14 and 19 at opposite sides of the shaft 19.

Figure 1:
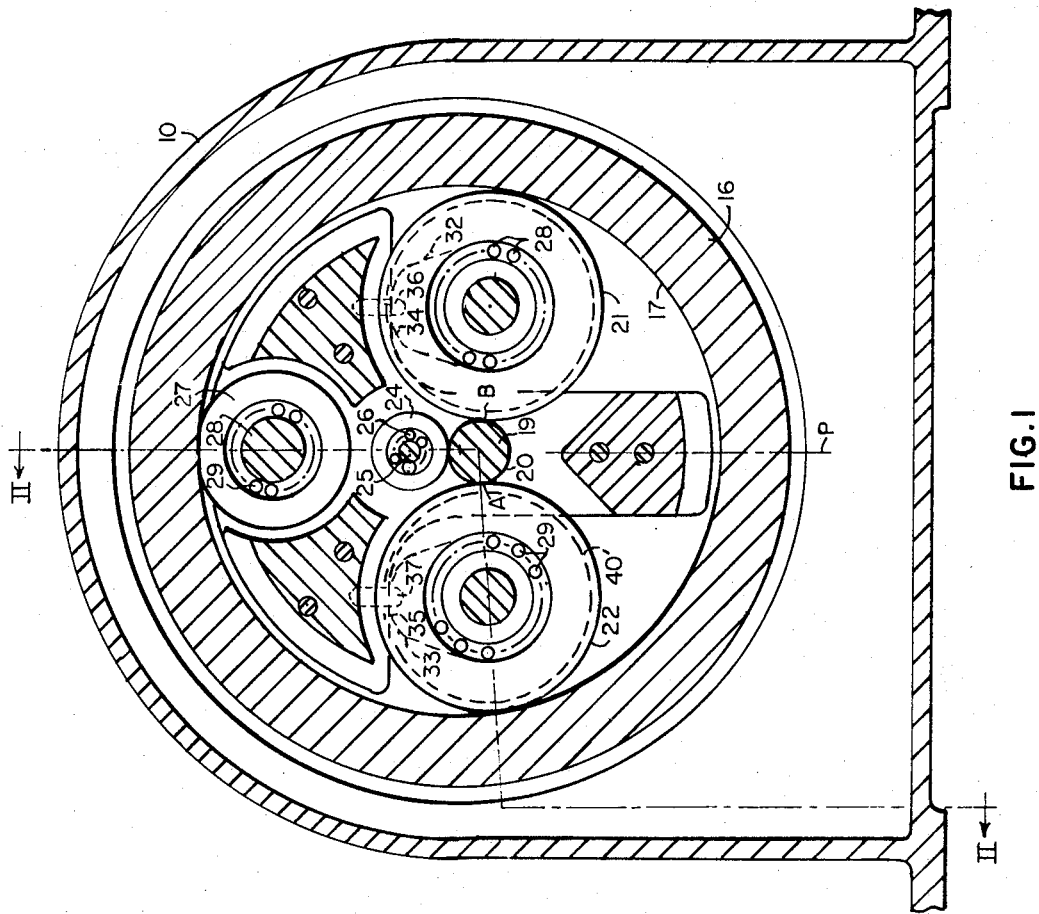
FIG. 1 is a cross-sectional view showing the principal parts of the transmission.

Motion transmitting traction rollers 21 and 22 are disposed in the annular path at each side of the axial plane P in engagement with the traction surfaces 17 and 20 of the traction ring 16 and the shaft 19. The motion transmitting rollers 21,22 are backed up by a T-shaped support structure 23a and 23b firmly connected to, or forming part of, the base 11. The rollers 21, 22 are, however, free to move away from the support structure 23 so that they may be drawn by the forces transmitted through the transmission into a narrower section of the annular path between the traction ring 16 and the shaft 19 to cause firmer engagement between the traction ring 16, the rollers 21 and 22, and the shaft 19.

The angle between the planes defined by the axis of shaft 19 and the points of engagement A and B of the traction rollers 21 and 22 with the shaft 19 is either more or less than 180° and a back-up roller 24 is disposed in engagement with the shaft end 19 at that side at which this angle is more than 180°. The back-up roller 24 is supported by the housing 10 as by shaft 25 and roller bearing 26.

Preferably, the angle between the points of engagement A and B is close to 180° to maintain the required back-up force provided by the back-up roller 24 at a relatively small value. The reaction forces on the traction ring 16 as caused by its engagement with the traction rollers 21 and 22 may be taken up by the output shaft bearing 15 or any other support arrangement for the traction ring 16 in the housing 10 but, preferably, a balance roller 27 is supported on the housing parts 23a and 23b within the traction ring 16 by a shaft 28 and bearing 29, the balance roller 27 being disposed between the back-up roller 24 and the traction ring 16, preferably along the plane P, so that all the forces developing during operation for frictional engagement of traction rollers remain in the structures within the traction ring 16. Since the traction ring 16, the traction rollers 21 and 22, and the shaft end portion or sun roller 19 preferably consist of hard metal and a lubricant is contained in the housing 16, the friction coefficient is relatively low and large forces are necessary to maintain them in engagement with each other. The surrounding housing 10, however, is subject essentially only to the forces necessary to supply a change in torque.

FIG. 3 shows the support structure 23 disposed inside the traction ring 16 which support structure forms the back-up for the traction rollers 21 and 22. The traction rollers 21 and 22 are mounted by bearings 28 and 29 (see FIG. 1) on shafts 30 and 31 which carry back-up members 32 and 33 at each side of the rollers 21 and 22. The back-up members 32 and 33 have curved surface portions 34 and 35 whose centers of curvature coincide with the axes of the shafts 30 and 31, respectively. The curved surface portions 34 and 35 only abut the support structure to insure freedom of movement of the rollers 21 and 22 in radial direction and away from the support structure 23. Pins 36 and 37 extend into openings in the support structure 23 and in the back-up members 32 and 33 to maintain them in their proper position. Springs 38 and 39 may be disposed between the back-up members 32 and 33 and the support structure 23 to insure engagement of the traction rollers 21 and 22 with the traction ring 16 and the input shaft 19 at all times.

Figure 2:
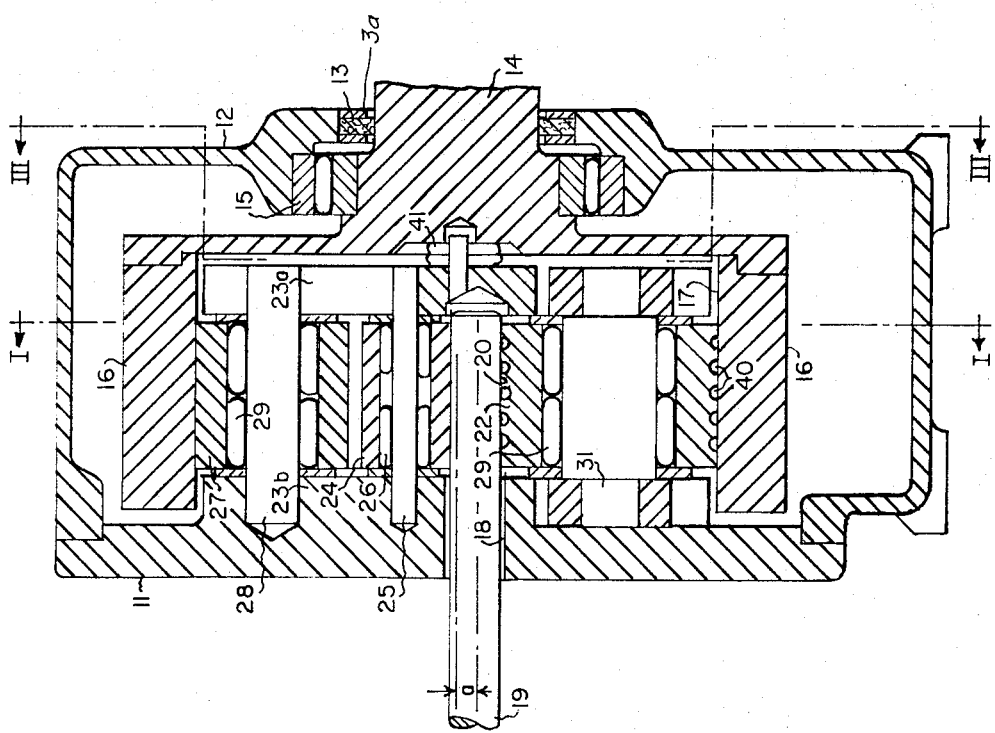
FIG. 2 is a cross-sectional view along line II—II of FIG. 1.

As shown in FIGS. 1 and 2, the traction rollers 21 and 22 have annular grooves 40 which are preferably uniformly spaced from each other and allow excess lubricant to excape from the contact area between the rollers and the traction ring 16. Of course, such grooves may be formed in the traction surfaces 17 and 20 of the traction ring 16 and the shaft 19 instead. Also, an axial thrust bearing or shims 41 may be disposed between the shaft 14 and the support structure 23a to prevent contact between the shaft 14 and the support structure 23a.

Operation of the transmission is best explained on the basis of FIG. 4 which shows the transmission schematically. Assuming, for example, that the transmission is used as a speed-up drive, that is that the traction ring 16 is the driving part and shaft 19 is the driven part and the traction ring 16 rotates in the direction as indicated by the arrow 42, the traction roller 21 is pulled into the narrowing annular path between the traction ring 16 and the driven shaft 19. Note that the roller 21 is free to move away from the support structure 23 (FIG. 3). This forces the driven shaft 19 into firm engagement with the traction roller 22 and the back-up roller 24. The traction roller 22 is supported by the back-up member 33 (FIG. 3) which abuts the support structure 23. The traction roller 22, therefore, remains in its position and is firmly forced in frictional engagement with the traction ring 16 and the driven shaft 19.

The contact force CF which causes frictional engagement between the traction rollers and the driving and driven members is proportional to the torque transmitted and dependent on the size of the angle $\alpha$ between a line interconnecting the contact points (AC, BD) of a roller and a radial line through the contact points. The angle $\alpha$ depends on the distance a between the axes of the shafts 14 and 19. The distance a is selected in accordance with properties of the materials used for the surfaces which are in frictional engagement with each other. The smaller the distance a the larger is the contact force CF, CF being large enough to prevent slippage.

The torque effective on the traction ring 16 supplies the tangential forces TF at the points of contact between traction ring 16 and traction rollers 21, 22 and sun roller (end of shaft 19) and traction rollers 21, 22 which forces drive the roller 21 into the narrowing annular path between the traction ring 16 and the driven shaft 19 thereby producing the contact forces $CF_{21}$ for roller 21 and CF 22 for roller 22. The reactive forces of the contact forces CF on both rollers are R—CF. For roller 21 R—CF equals 2TF which, however, is directed oppositely so that the roller 21 is in equilibrium. For roller 22, R—CF and 2TF act in the same direction so that the roller 22 abuts the support structure 23 with the force R—CF + 2TF. If the traction ring 16 is driven in a direction opposite to that indicated by arrow 42, the traction roller 21 is supported by the support structure 23 and roller 22 moves away from the support structure.

To firmly engage the shaft 19 between the traction rollers 21 and 22, the axes of the traction rollers and the shaft 19 are not arranged in a single plane but an angle of slightly less than 180° is formed between the planes defined by the axes of the rollers and the axis of the shaft 19, the shaft 19 being retained between the traction rollers by back-up roller 24.

The contact forces of the traction rollers 21 and 22, CF 21 and CF 22, produce a radial traction ring force RF which may be taken up by the bearing 15, or, as shown in the preferred embodiment, by the balance roller 27 engaging the traction ring with a ring balancing force RBF equal to but directed opposite to RF.

This has the advantage that practically all forces effective for causing engagement between the traction rollers and the driving and driven members remain within the area defined by the traction ring 16.

If the transmission ratio is very large the diameter of the sun roller is very small compared to the diameter of the traction ring and to the diameter of the traction rollers so that there is little space left for the back-up roller. The back-up roller, therefore, would have to be very small.

In one embodiment of the invention as shown in FIG. 5 the back-up roller 24 and the traction rollers 21 and 22 have annular recesses 43, 44, and 45 arranged such that the peripheral portions 46 of the back-up roller 24 extend into the recesses 43 and 44 in the traction rollers 21 and 22 and abut the shaft end or sun roller 19. In other respects, the arrangement shown in FIG. 5 is the same as that of FIG. 1 so that no further explanation is necessary with regard to FIG. 5.

The transmission described is very simple and easy to manufacture since all rollers are cylinders with circular cross-section which can be ground accurately and inexpensively. The traction rollers require none or only small support forces so that inexpensive needle bearings are sufficient for support. The highest speed shaft or sun roller 19 requires no support bearings at all.

The ratio of motion transmission for which the present motion transmitted device can be designed is very wide. Especially high transmission ratios can be obtained with an arrangement as shown in FIG. 5 in which the transmission ratio is about 20:1.

The invention is, of course, not limited to the arrangements as described and shown in the drawings. It should be clear that the shaft 19 could be the driving member and the traction ring 16 the driven member if a reduction of speed is intended. If transmission of power only in one sense of rotation would be required, one of the traction rollers could be supported to permit only slight radial movement thereof, whereas the other roller may have no supporting shaft and no bearing but just be floating in the space between the traction ring 16 and the shaft end 19.

Furthermore, the back-up roller could be large enough to abut also the inner surfaces of the traction ring thereby functioning like a traction roller and, at the same time, transmitting the back-up forces for the sun roller 19 directly to the traction ring 16.

Finally, one of the traction rollers and the back-up and balance rollers, or two traction rollers, could be firmly supported while both, the sun roller and the traction ring are free to move radially and are forced in engagement with the firmly supported rollers by another roller which is free to be drawn into the narrowing annular path between the traction ring and the sun roller.

What is claimed is:

1. In a rotary motion transmitting device having input and output shafts, a traction ring carried by one of said shafts for rotation therewith, the other of said shafts having an end portion extending into said traction ring, said shafts being arranged for rotation about parallel axes disposed at a predetermined distance from each other, such that an annular path of varying width is formed between the traction ring and the end portion of said other shaft, at least two motion transmitting traction rollers disposed in said annular path with their axes disposed at one side of a plane through the axis of the other shaft and in contact with said other shaft end portion and said traction ring, and back-up means supporting said other shaft end portion to prevent movement thereof toward the other side of said plane, at least one of said traction rollers being free to be pulled into a narrowing section of said annular path thereby causing firm engagement of the traction ring and the other shaft end portion with said traction rollers, said traction rollers having spaced circumferential grooves for receiving lubricant present in the transmission and escaping from the contact area of the rollers during rotation thereof.

2. A rotary motion transmitting device as claimed in claim 1, wherein said back-up means is a roller in contact with the surface of said other shaft end portion.

3. A rotary motion transmitting device as claimed in claim 2, wherein said back-up roller is supported in a housing with its axis disposed parallel to the axes of said shafts and essentially in an axial plane as defined by the axes of said shafts, said one shaft being also supported by said housing.

4. A rotary motion transmitting device as claimed in claim 3, wherein a balance roller is supported inside said traction ring by said housing rotatably about an axis extending parallel to the axis of said shafts and essentially in said axial plane, said balance roller abutting and supporting said traction ring.

5. A rotary motion transmitting device as claimed in claim 2, wherein said back-up means is a roller in contact with the traction ring surface opposite its contact area with the other shaft end portion.

6. A rotary motion transmitting device as claimed in claim 3, wherein said traction rollers have peripheral recesses, and said back-up roller has at least one peripheral portion extending into the peripheral recesses formed in the traction rollers and abutting the other shaft end portion.

7. A rotary motion transmitting device as claimed in claim 1, wherein said traction rollers are supported by back-up members engaging portions of said housing and holding the traction rollers in said annular path and in engagement with said other shaft end portion and said traction ring.

8. A rotary motion transmitting device as claimed in claim 7, wherein said back-up members have curved surface portions abutting substantially flat housing portions and having a center of curvature essentially coinciding with the axis of the respective traction roller.

9. A rotary motion transmitting device as claimed in claim 8, wherein pins are disposed in aligned openings formed in said back-up members and the adjacent housing portions to maintain the back-up members in proper position.

10. A rotary motion transmitting device as claimed in claim 8, wherein springs are disposed between the back-up members and the adjacent housing portions to insure engagement of the traction rollers with the drum and the other shaft end.

11. In a rotary motion transmitting device having input and output shafts, a traction ring carried by one of said shafts for rotation therewith, the other of said shafts having an end portion extending into said traction ring, said shafts being arranged for rotation about parallel axes disposed at a predetermined distance from each other, such that an annular path of varying width is formed between the traction ring and the end portion of said other shaft, at least two motion transmitting traction rollers disposed in said annular path with their axes disposed at one side of a plane through the axis of the other shaft and in contact with said other shaft end portion and said traction ring, and a back-up roller supporting at one side said other shaft end portion to prevent movement thereof toward the other side of said plane and being in contact with the traction ring surface opposite its contact area with the other shaft end portion, at least one of said traction rollers being free to be pulled into a narrowing section of said annular path thereby causing firm engagement of the traction ring and the other shaft end portion with said traction rollers said traction rollers having peripheral recesses, and said back-up roller having at least one peripheral portion extending into the peripheral recesses formed in the traction rollers and abutting the other shaft end portion.

12. A rotary motion transmitting device as claimed in claim 11, wherein said traction rollers are supported by back-up members engaging portions of said housing and holding the traction rollers in said annular path and in engagement with said other shaft end portion and said traction ring, said back-up members having curved surface portions abutting substantially flat housing portions and having a center of curvature essentially coinciding with the axis of the respective traction roller.

13. A rotary motion transmitting device as claimed in claim 12, wherein pins are disposed in aligned openings formed in said back-up members and the adjacent housing portions to maintain the back-up members in proper position, and springs are disposed between the back-up members and the adjacent housing portions to insure engagement of the traction rollers with the drum and the other shaft end.

* * * * *